United States Patent [19]
Ming-Shun

[11] Patent Number: 5,615,725
[45] Date of Patent: Apr. 1, 1997

[54] OUTDOOR SUN SHADE

[75] Inventor: Yang Ming-Shun, Taipei, Taiwan

[73] Assignee: Formosa Saint Jose Corp., Taipei, Taiwan

[21] Appl. No.: 572,634

[22] Filed: Dec. 14, 1995

[51] Int. Cl.[6] ........................................ B60J 1/20
[52] U.S. Cl. .................. 160/370.22; 160/46; 160/66; 160/294; 296/136
[58] Field of Search ................. 160/46, 66, 291, 160/294, 301, 302, 304.1, 370.22; 296/97.6, 97.8, 88, 89, 163, 136, 95.1

[56] References Cited

U.S. PATENT DOCUMENTS

| | | | |
|---|---|---|---|
| 3,036,629 | 5/1962 | Nicholas | 160/294 X |
| 3,097,014 | 7/1963 | Francis | 296/95.1 |
| 4,657,298 | 4/1987 | Yong O | 296/136 |
| 4,805,654 | 2/1989 | Wang | 296/136 X |
| 4,848,827 | 7/1989 | Ou | 296/95.1 X |
| 4,929,016 | 5/1990 | Kastanis | 296/136 |
| 5,022,700 | 6/1991 | Fasiska et al. | 296/136 X |
| 5,088,347 | 2/1992 | Wanlass | 74/625 |
| 5,226,467 | 7/1993 | Lii | 160/302 |
| 5,230,545 | 7/1993 | Huang et al. | 296/163 X |
| 5,269,359 | 12/1993 | Pozzi | 160/46 |
| 5,294,167 | 3/1994 | Yu | 296/136 X |
| 5,417,469 | 5/1995 | Hammond | 296/163 |
| 5,423,506 | 6/1995 | Spoon | 296/163 X |
| 5,433,499 | 7/1995 | Wu | 296/95.1 |
| 5,437,298 | 8/1995 | Lin | 160/46 X |
| 5,462,329 | 10/1995 | Cheng | 160/370.22 X |
| 5,468,040 | 11/1995 | Hsieh et al. | 160/370.22 X |

FOREIGN PATENT DOCUMENTS 167500  8/1986  European Pat. Off. ............... 160/46

*Primary Examiner*—Blair Johnson
*Assistant Examiner*—Bruce A. Lev
*Attorney, Agent, or Firm*—Erik M. Arnhem

[57] ABSTRACT

The present invention consists of a screen-rolling device, two fixing frames for mounting the screen-rolling device on the roof of a car and two support frames for mounting the screen-rolling device on the ground, wherein the screen-rolling device is designed to adjust and control stretching or rolling a canvas screen through a twisting spring set which can generate a twisting force along with the rotation of a movable tube, the fixing frames are designed to mount the screen-rolling device on the roof of a car, and the support frames are designed to mount the canvas screen of the screen-rolling device on the ground so as to form an outdoor sun shade.

3 Claims, 14 Drawing Sheets

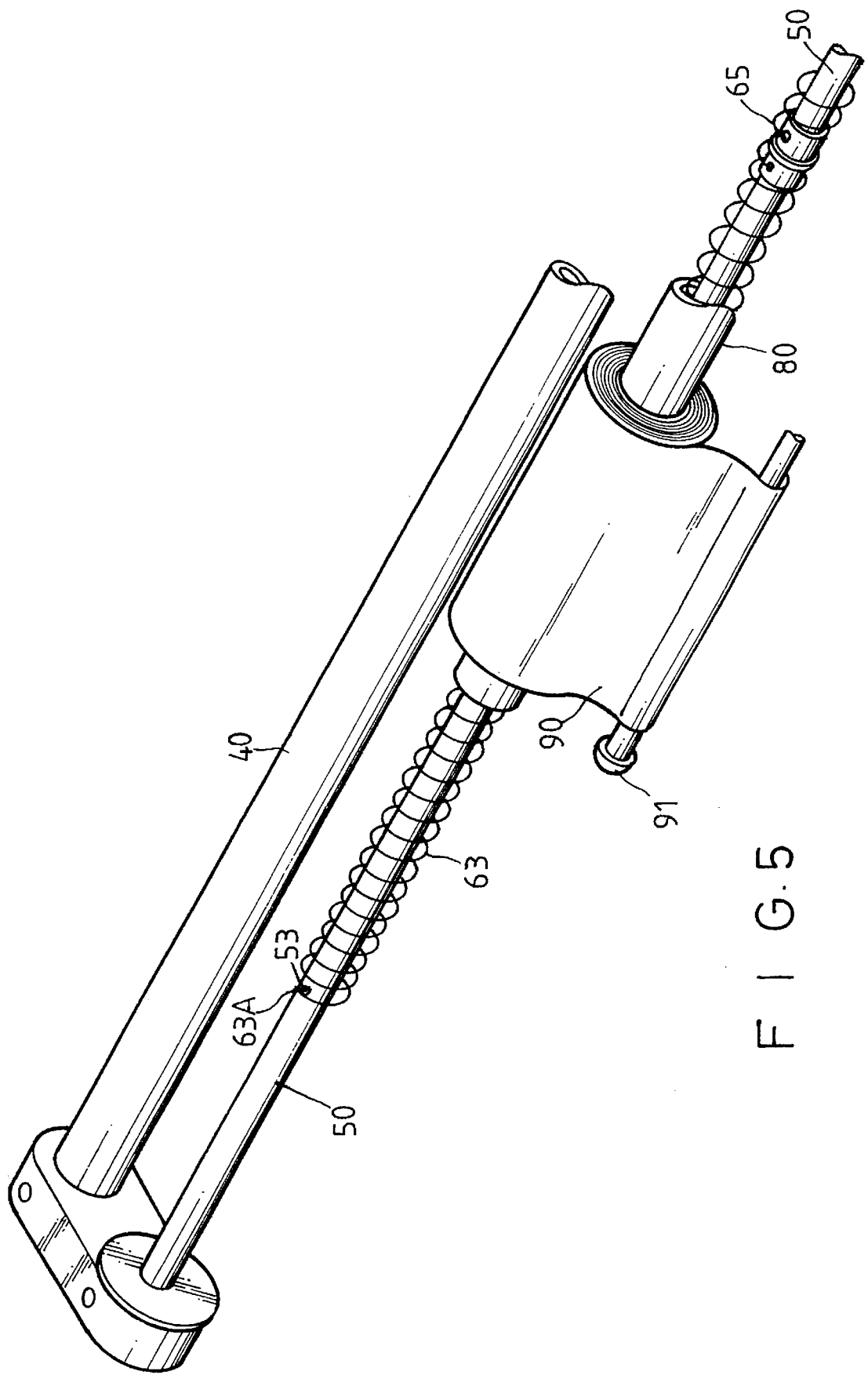

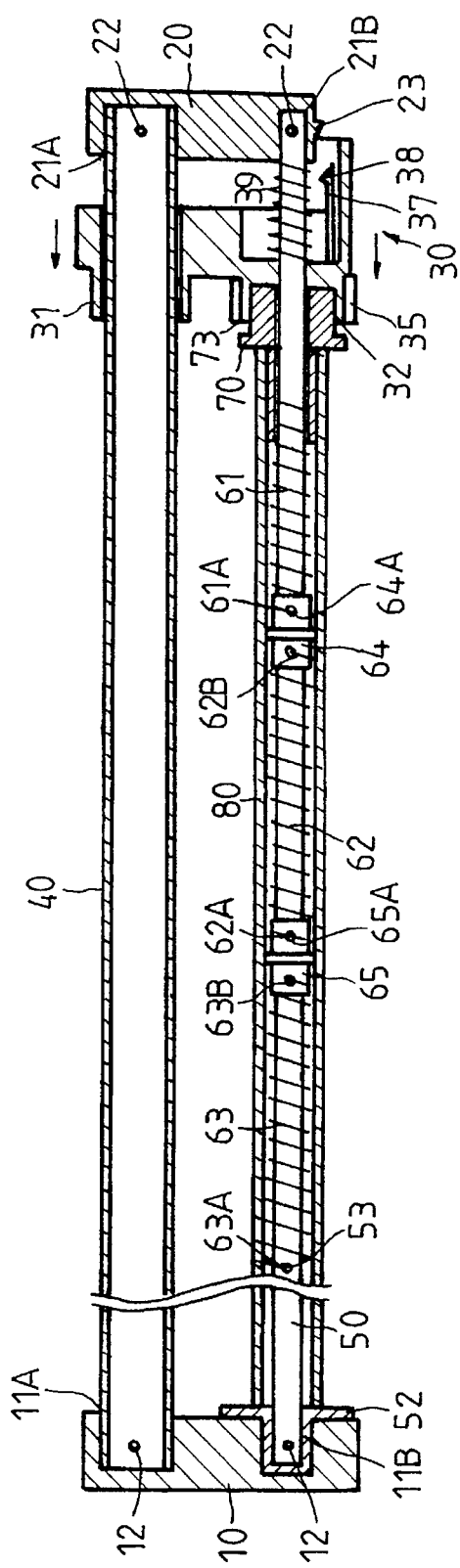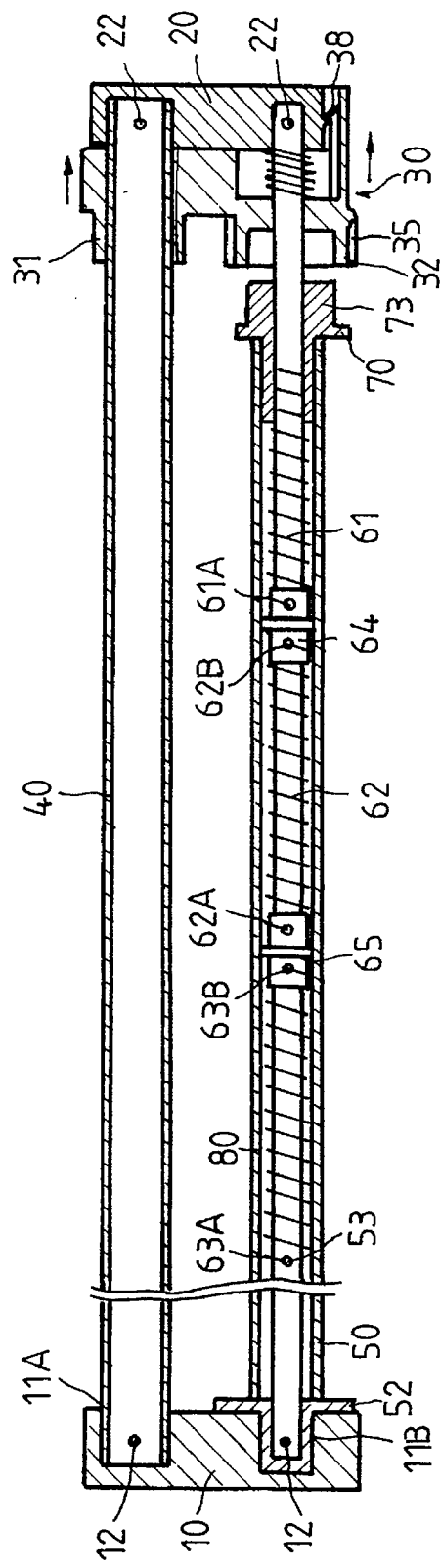

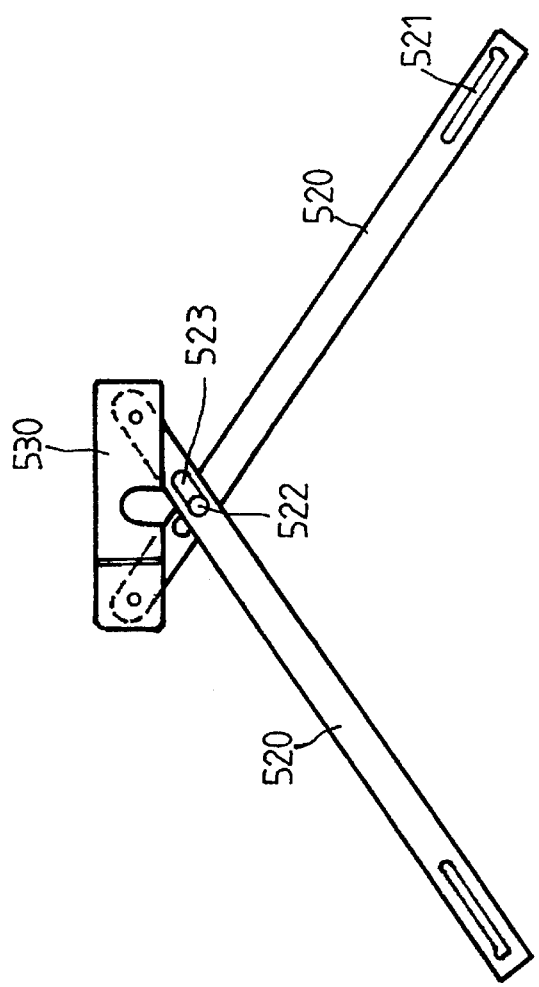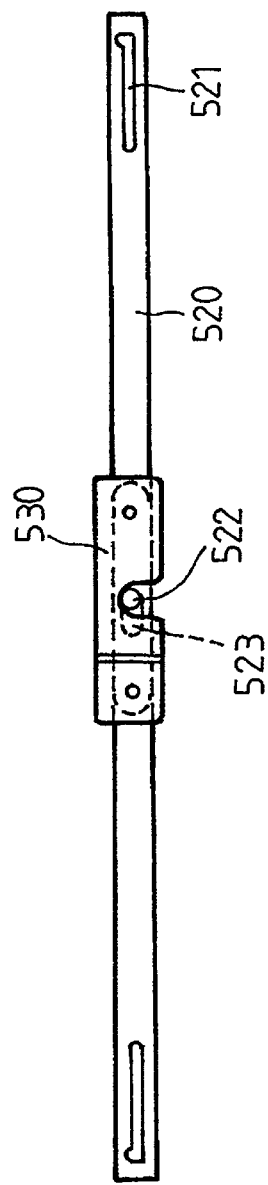

OUTDOOR SUN SHADE

BACKGROUND OF THE INVENTION

At weekends or on holidays, family members and/or good firends going to country-side by car for leisure activites such as sighteeing, fishing, camping, picnic, etc. have been very popular gradually so as to relax their daily busy and tense moods. However, most outdoor sites in the field in general are empty and extensive and lack of adequate buildings for shading the hot sunshine. As a matter of fact, to proceed with an outdoor activity in hot weather is rather intolerable. If a car is equipped with a sun shade, the people can use such an outdoor sun shade to proceed with their leisure activities without being suffered from the hot sunshine. The present invention is aimed at solving the foregoing problem.

SUMMARY OF THE INVENTION

The present invention consists of a screen-rolling device, two fixing frames for mounting the screen-rolling device on the roof of a car and two support frames for mounting the screen-rolling device on the ground, wherein the screen-rolling device is designed to adjust and control stretching or rolling a canvas screen through a twisting spring set which can generate a twisting force along with the rotation of a movable tube, the fixing frames are designed to mount the screen-rolling device on the roof of a car, and the support frames are designed to mount the canvas screen of the screen-rolling device on the ground so as to form an outdoor sun shade.

BRIEF DESCRIPTION OF THE DRAWINGS

FIG. 5 is a partial section view of the left side of the screen-rolling device according to the present invention.

FIG. 6 is a section view of the screen-rolling device moving left on a movable seat according to the present invention.

FIG. 7 is a section view of the screen-rolling device moving right on a movable seat according to the present invention.

FIGS. 16 and 17 are optional side views of stretched open and folded down two movable arms according to the present invention.

DETAILED DESCRIPTION

Figure 1:
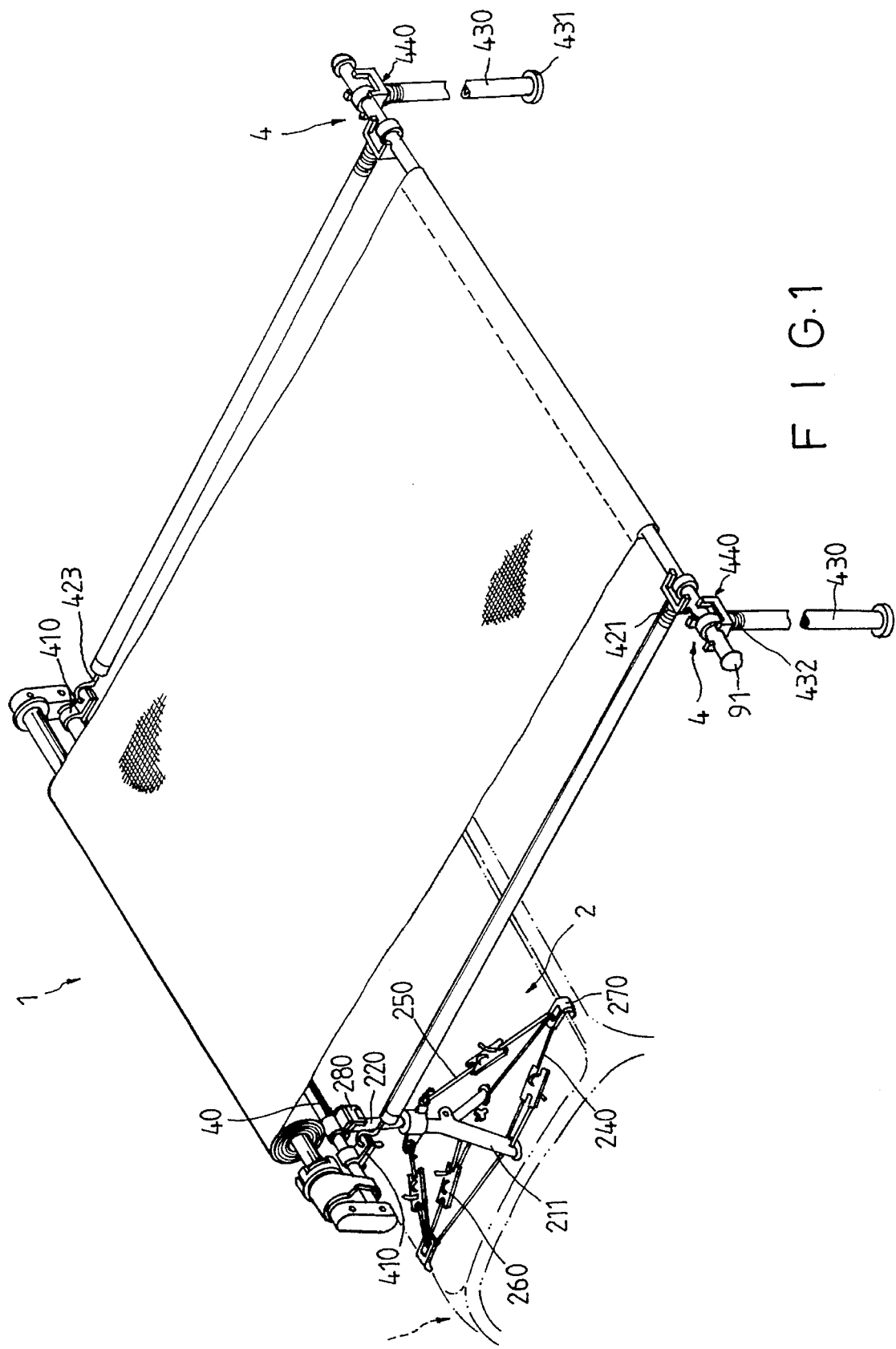
FIG. 1 is an example of the screen-rolling device, fixing frames and support frames constructed for use according to the present invention.
Figure 2:
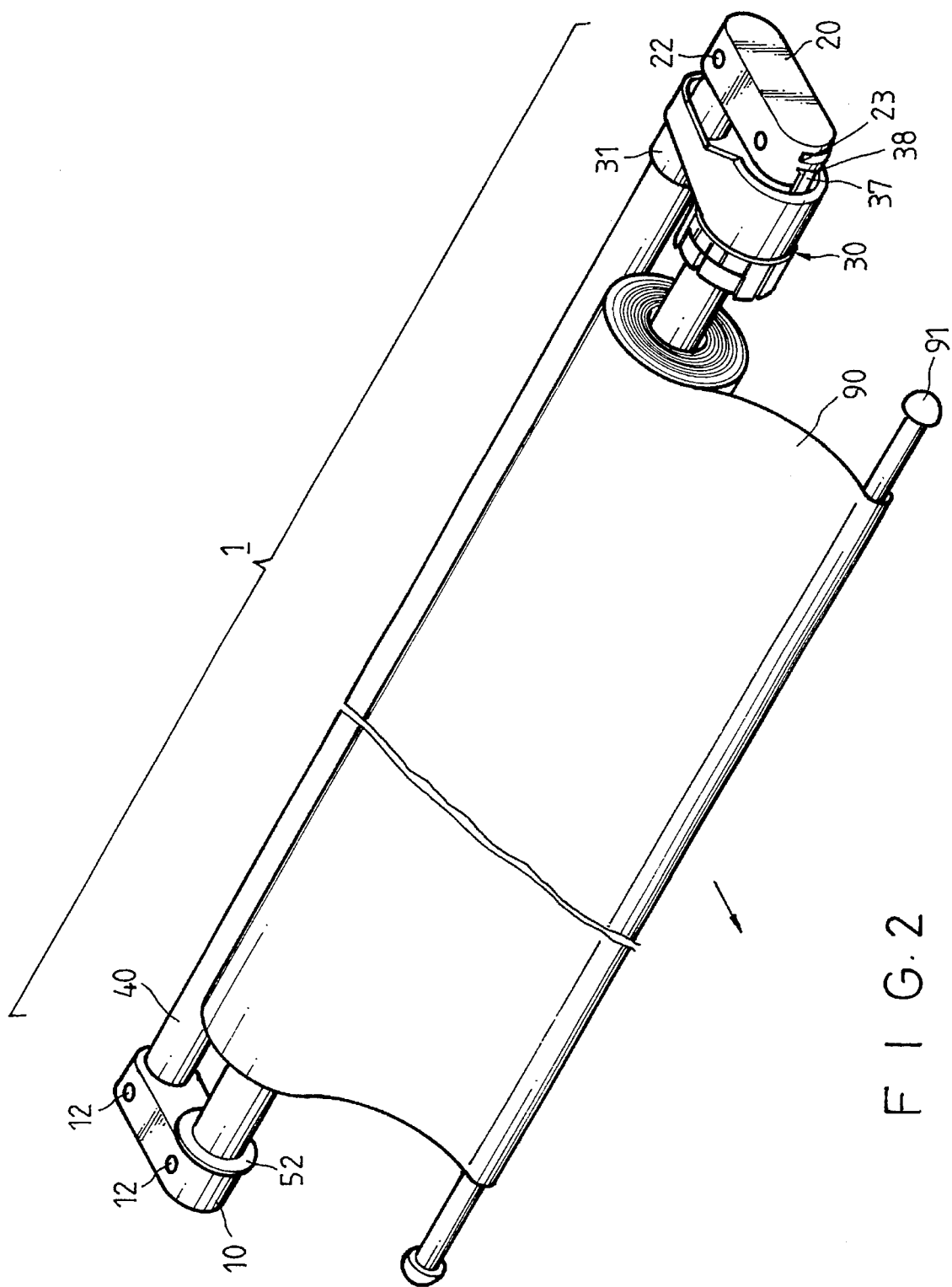
FIG. 2 is an appearance view of the screen-rolling device according to the present invention.
Figure 3:
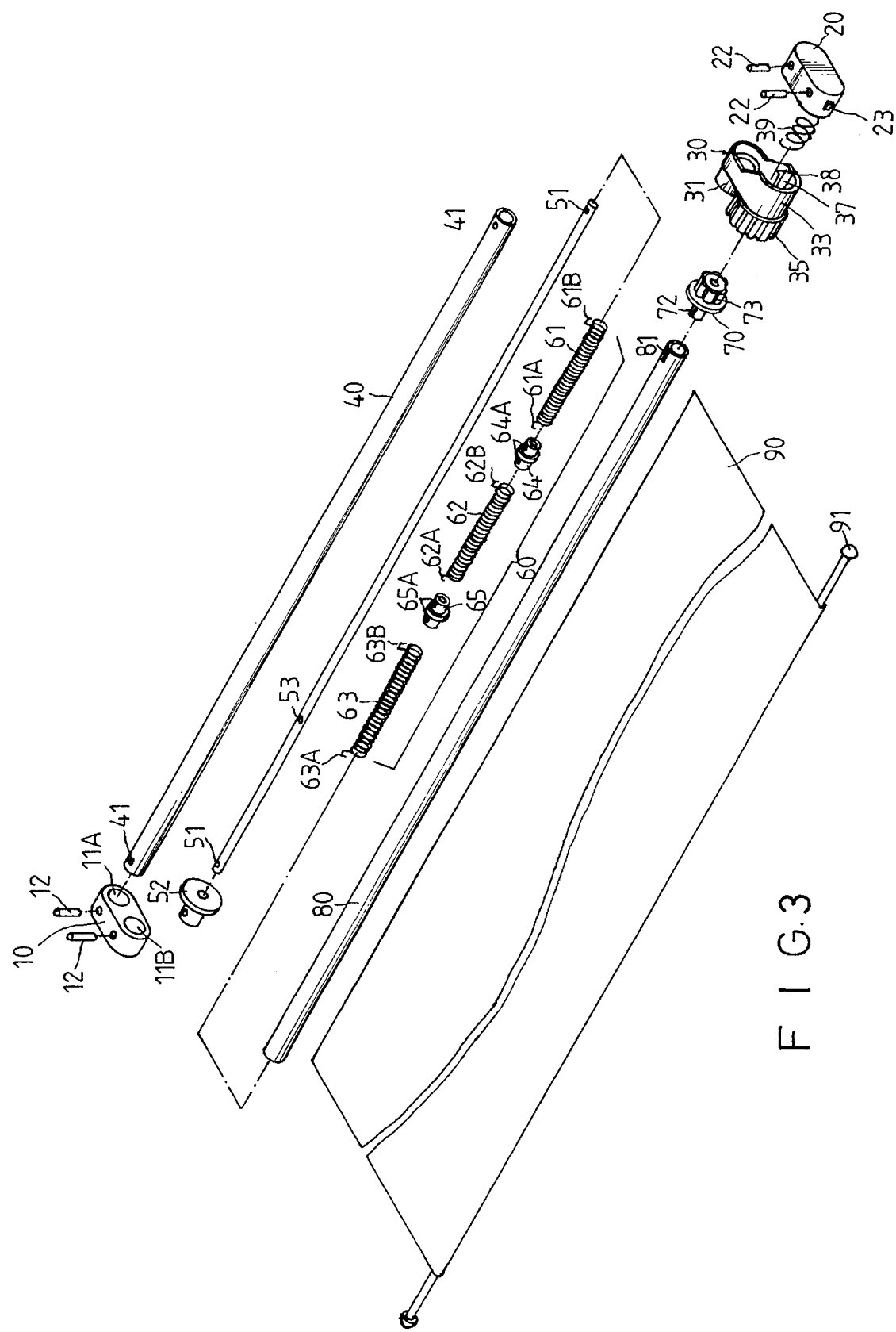
FIG. 3 is a breakdown view of the screen-rolling device according to the present invention.
Figure 4:
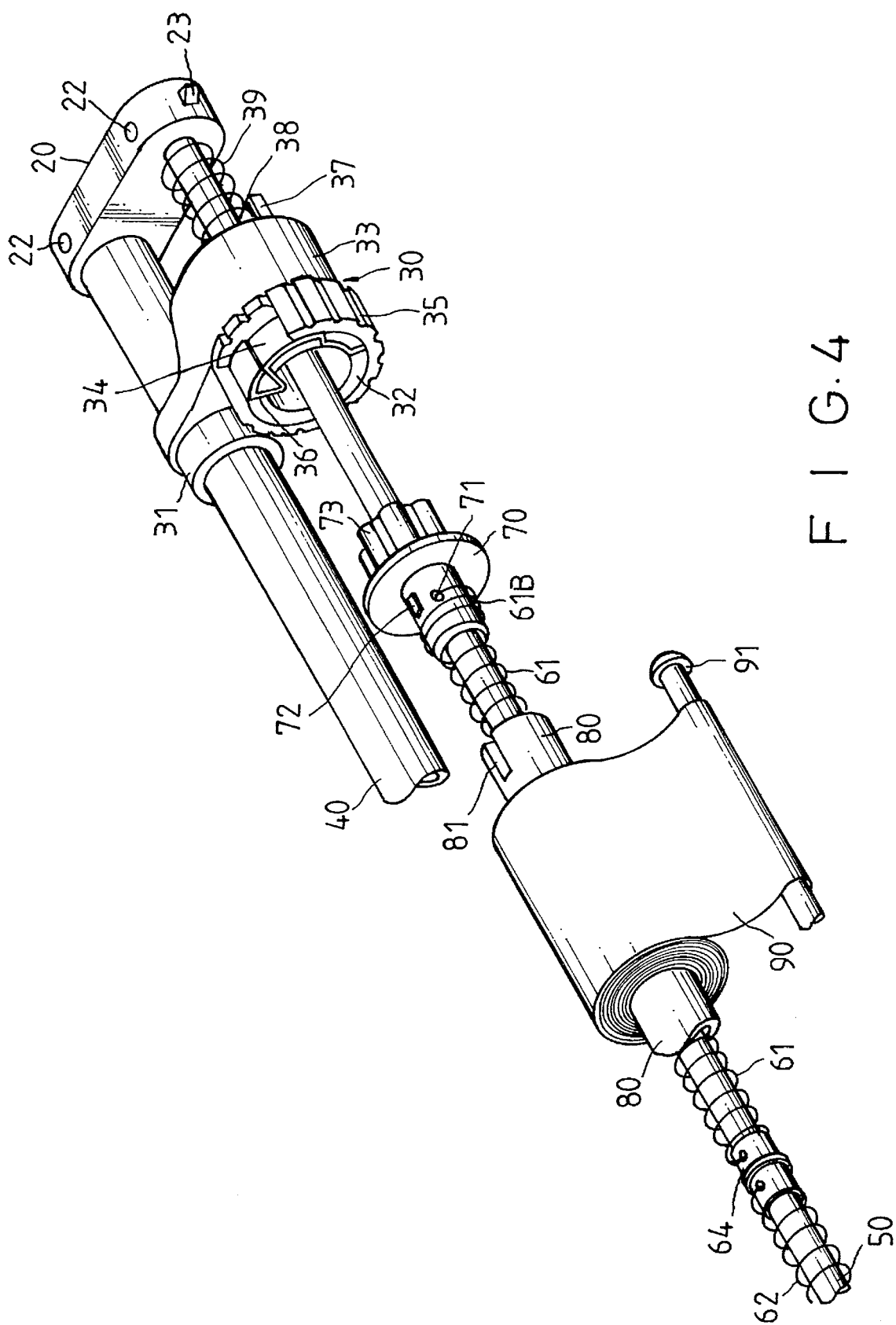
FIG. 4 is a partial section view of the right side of the screen-rolling device according to the present invention.
Figure 10:
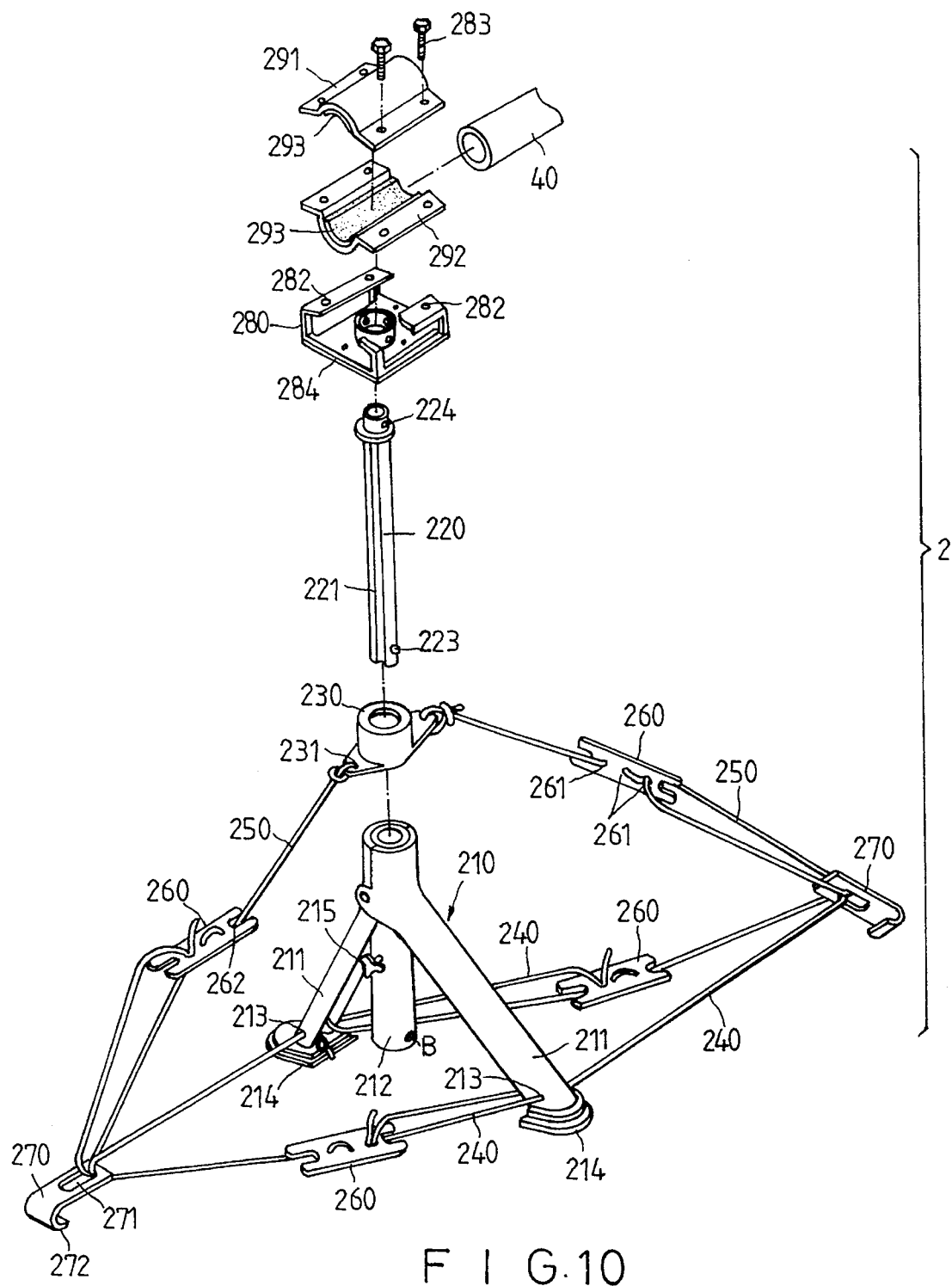
FIG. 10 is a breakdown view of the fixing frames (2) according to the present invention.

As shown on FIGS. 1, 2 and 10, the present invention consists of a screen-rolling device 1, two fixing frames (2) for mounting the screen-rolling device (1) on the roof of a car (3), and two support frames (4) for mounting the screen-rolling device (1) on the ground.

As shown in FIGS. 1, 2, 3, 4 and 6, the screen-rolling device (1) consists of a left fixing seat (10), a right fixing seat (20), a movable seat (30), a fixing rod (40), a shaft lever (50), a twisting spring set (60), a catch element (70), a movable tube (80) and a canvas screen (90). One end of the canvas screen (90) is fixed on the movable tube (80) and can be rolled by the movable tube (80), and another end thereof is provided with a tie rod (91) for stretching the canvas screen (90).

As shown therein, each of two ends of the fixing rod (40) is provided with an insert hole (41). After the two ends of the fixing rod (40) are respectively inserted in two fixing holes (11A, (21A) on the left fixing seat (10) and the right fixing seat (20), these two ends of the fixing rod (40) can be respectively fixed on the left fixing seat (10) and the right fixing seat (20) by means of two pins (12), (22); in addition, each of two ends of the shaft lever (50) is also respectively provided with an insert hole (51), one end of the shaft lever (50) is provided with a loop coter (52), and both the shaft lever (50) and the loop coter (52) are inserted in a fixing hole (11B) on the left fixing seat (10). After another end of the shaft lever (50) is inserted in a fixing hle (21B) on the right fixing seat (20), the shaft lever (50) is also respectively fixed on the left fixing seat (10) and the right fixing seat (20) by the said two pin (12), (22) without coming off therefrom.

As shown in FIGS. 3, 4, 5 and 6, the twisting spring set (60) consists of a larger twising spring (61), a middle twisting spring (62), a smaller twising spring (63) and two connecting thimbles (64), (65) for connecting these three twisting springs (61), (62), (63). Two hook holes (64A) and (65A) are respectively provided on the two side walls of these two connecting thimbles (64), (65). A hook is provided at each of two ends of each of these three twisting springs (61), (62), (63) respectively, wherein the hook (61A) at one end of the larger twisting spring (61) is hooked and fixed in the hook hole (64A) on the connecting thimble (64), two hooks (62A), (62B) at two ends of the middle twisting spring (62) are respectively hooked and fixed in the hook holes (65A), (64A) on the connecting thimbles (65), (64) respectively, and the hook (63B) at one end of the smaller twisting spring (63) is hooked and fixed in the hook hole (65A) on the connecting thimble (65). After these three twisting springs (61), (62), (63) and these two connecting thimbles (65), (65) are assembled as a twisting spring set (60), the shaft lever (50) can be nested in the twisting spring set (60). As shown in the drawings, the hook (63A) at another end of the smaller twisting spring (63) is first hooked and fixed in a hook hole (53) nearby the center of the shaft lever (50), and the hook (61B) at another end of the larger twisting spring (61) is then hooked and fixed in a hole (71) on a catch element (70), the assembly of the twisting spring set (60) is finished.

As shown in FIGS. 3, 4, 5, 6 and 7, the twisting spring set (60) is nested on the shaft lever (50), the movable tube (80) is nested on the twisting spring set (60), and the right end of the movable tube (80) is provided with a slot (81). One side of the catch element (70) is provided with a hook hole (71) and a convex block (72), and another side thereof is a gear (73), the hook hole (71) is designed to hook and fix the hook (61B) of the larger twisting spring (61), and the convex block (72) can be inserted in the slot (81) on the movable tube (80) so as to combine the catch element (70) and the movable tube (80) together through insertion. As shown in the said drawings, since the shaft lever (50) has been fixed on the two fixing seats (10) (20), and the hook (63A) of the twisting spring set (60) is fixed in the hook hole (53) on the shaft lever (50), so the said hook (63A) can be regarded as a "fixing end" of the twisting spring set (60) as a w,hole. In addition, the convex block (72) on the catch element (70) is inserted and fixed in the slot (81) on the movable tube (80), so the catch element (70) and the movable tube (80) are combined together; and another hook (61B) of the twisting spring set (60) is fixed in the hook hole (71) on the catch element (70), so the hook (61B) can be regarded as a "movable end" of the twisting spring set (60) as a whole. Therefore, when the unser applies a force to stretch open the canvas screen (90), the movable tube (80) can be actuated to rotate so as to further rotate the catch element (70) and the twisting spring set (60) at the same time and to force the twisting spring set (60) to generate a twisting force; and when the user releases the canvas screen (90), the twisting force of the twisting spring set (60) will force both the catch element (70) and the movable tube (80) to rotate in an opposite direction so as to fully roll the canvas screen (90), and at the same time, the twisting spring set (60) restores its original state of no twisting force.

In the foregoing twisting spring set (60), the wire diameters of larger, middle and smaller twisting springs (61), (62), (63) are 1.4 mm, 1.3 mm and 1.2 mm respectively in sequence. The twisting spring set (60) consists of these three springs (61), (62), (63) with the different wire diameters, and when a force is applied to the twisting spring set (60) to twist, firstly to twist the larger twisting spring (61) and then to twist the middle and smaller twisting spring (62), (63) in sequence, so the twisting force thereof as a whole is transmitted progressively, and the twisting spring set (60) will never lead to such drawbacks as unequal spring density and uneven density in the front and rear sections of spring, and the life of expectancy of the twisting spring set (60) can be prolonged.

Figure 9:
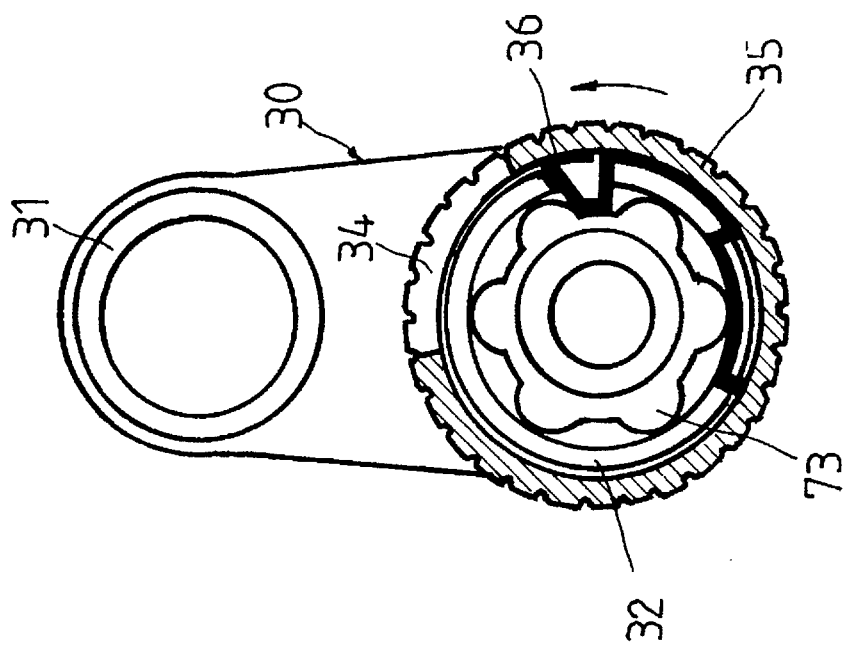
FIG. 9 is a section view of the elastic stop block pressed by a knob according to the present invention.
Figure 8:
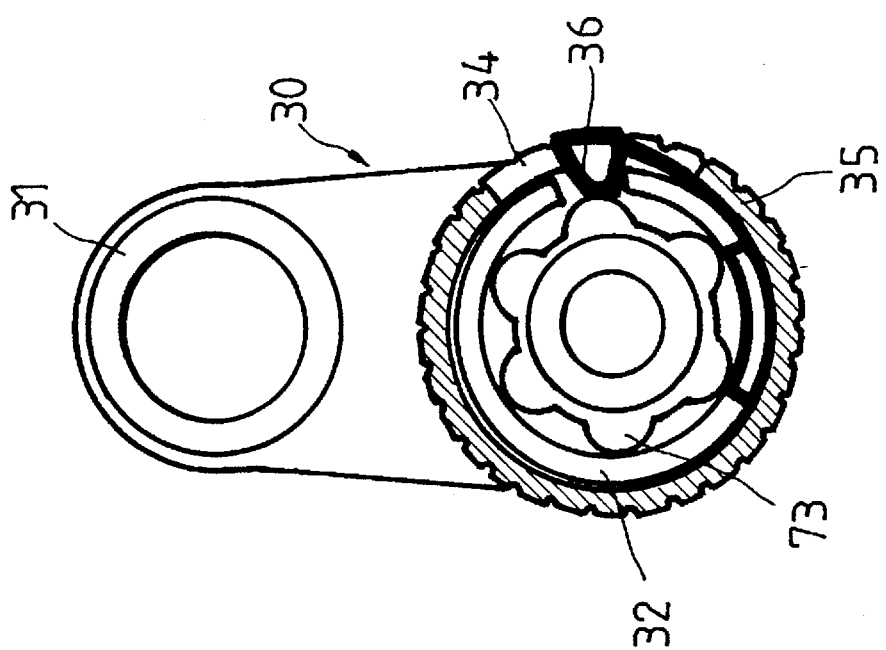
FIG. 8 is a section view of an elastic stop block capable of sliding on a gear according to the present invention.

As shown in FIGS. 2, 3, 4, 6 and 8, the movable seat (30) is provided with an upper toggle (31) and a lower toggle (32) in a symmetrical state, the upper toggle (31) is nested on the fixing rod (40) and the lower toggle (32) is nested on the shaft lever (50) so that the movable seat (30) can slide left and right on the fixing rod (40) and the shaft lever (50); as shown in the foregoing drawings, one side of the movable seat (30) is provided with a convex grip (33) to control the movable seat (30) sliding left and right, and the outer perimeter of the lower toggle (32) on another side of the movable seat (30) is provided with a knob (35) with a notch (34); in addition, a stop block (36) with elasticity is inerted on the wall of the lower toggle (32), so when the movable seat (30) moves left to nest the gear (73) of the catch element (70) in the lower toggle (32) of the movable seat (30) as shown in FIG. 6, and the elastic stop block (36) is just in the notch (34) on the knob (35) as shown in FIG. 8, the user stretches or rolls the canvas screen through rotation, an elastic, intermittent and sectional catch action is generated between the elastic stop block (36) and the gear (37) so as to effectively adjust and control the desirable length of stretching or rolling the canvas screen (90) without limitlessly stretching or rolling the canvas screen (90) out of control. After the user has set the desirable length of stretching or rolling the convas screen (90) as shown in FIG. 9, the knob (35) can be rotated to press the elastic stop block (36) to be tightly caught in the gear (73), so the movable tube (80) cannot rotate any more in order to achieve the purpose of positioning the canvas scren (90).

As shown in FIGS. 2, 3, 4 and 6, a separate brake rod (37) is inside the grip (33) on the movable seat (30), the front end of the grip (33) is a hook (38) which can catch a catch seat (23) at the lower end of the right fixing seat (20) so as to fix the movable seat (30) on the right fixing seat (20) as shown in FIG. 7, the gear (73) of the catch element (70) is released from the lower toggle (32) of the movable seat (80) so that the movable seat (30) is in a free state, the user can quickly stretch or roll the canvas screen (90). Furthermore, a compression spring (39) is provided inside the grip (33) and nested on the shaft lever (50). As shown in FIG. 9, when the movable seat (30) has been fixed on the right fixing seat (20), the compression spring (39) is in a state of compressed tensile; and when the user pushes the hook (38) of the brake rod (37) away from the catch seat (23) of the right fixing seat (20) as shown in FIG. 8, the compression spring (39) will use its own compressed tensile to move the movable seat (30) left so as to nest the lower gottle (32) on the gear (73) of the catch element (70) once again.

As shown in FIGS. 1 and 10, the fixing frame (2) consists of a foldable foot rest (210), a hollow tube (220), a cap (230), a foot rest rope (240), a cap rope (250), four catches (260), two hooks (270), a support seat (280), an upper clip (291) and a lower clip (292), wherein the foldable foot rest (210) consists of two corresponding round concave plates (211) to pivotally nest a thimble (212) so that the foldable foot rest (210) can be stretched open or folded down. Each bottom end of two round concave plates (211) is provided with two rope holes (213) and a soft pad (214), the rope holes (213) are designed to let the foot rest rope (240) pass therethrough, and the soft pad (214) is designed to prevent the foot rest (210) from scraping sheet metal when mounting the foot rest (210) on the roof of a car (3).

Figure 13:
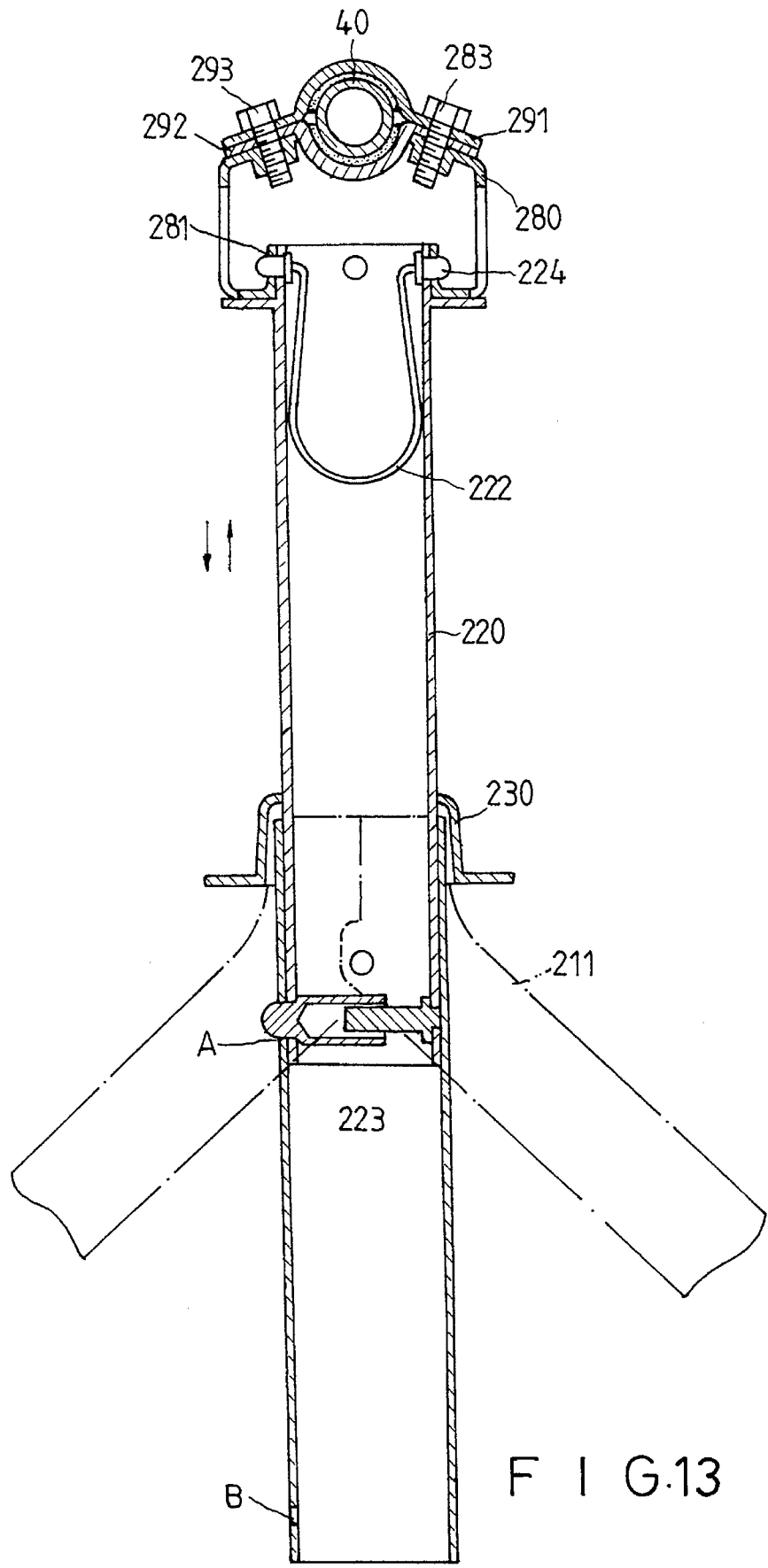
FIG. 13 is a section view of assembled support seat, hollow tube and foldable foot rest according to the present invention.

As shown in FIGS. 10 and 13, the hollow tube (220) is inserted in the thimble (212) of the foot rest (210) and fixed therein through locking a bolt (215) in a concave slide way (221) on the perimeter of the hollow tube (220). A U-shaped catch (222) is nested in the top end of the hollow tube (220), and a spring catch (223) is nested in the bottom end thereof, two ends (224) of the U-shaped catch (222) can be caught in the catch holes (281) on the support seat (280) so that the hollow tube (220) and the support seat (280) can be combined together; and the spring catch (223) can be caught in an upper hole (A) or lower hole (B) on the thimble (212) so as to adjust and control a higher or lower position of the hollow tube (220) in the thimble (212).

As shown in FIGS. 10 and 13, four catch holes (281) at the center of support (280) are designed to catch the two ends (224) of the U-shaped catch (222), and two threaded holes (282) on each of two sides of the support (280) are designed to lock four screws (283) therein so as to fix the upper clip (291) and the lower clip (292). A soft liner (293) is adhered to the inner wall of upper and lower clips (291), (292), so when the fixing rod (40) of screen-rolling device (1) is clipped and fixed by the upper and lower clips (291), (292), the soft liner (293) can step up the clamping force of these two clips (291), (292) to clip and fix the fixing rod (40), and the screen-rolling device (1) can be stably mounted on the fixing frame (2). As shown in FIG. 10, a soft gasket (284) can also be provided to the bottom surface of support (280) so as to let the support seat (280) be more beautiful and practical.

The cap (230) is nested at the top end of the foldable foot rest (210), and two opposite rope holes (231) on two sides of the cap (230) are designed to let the cap rope (250) pass there-through. Each catch (260) is provided with three catch holes (261) and two clamps (262), and the hook (270) is provided with a hook hole (271) and a hook (272). When to apply the cap rope (250) and the foot rest rope (240) thereto, the four catches (260) are respectively fixed on the two opposite foot rest ropes (240) and two opposite cap ropes (250) which are caught in the hook holes (271) on two hooks (270) respectively.

Figure 11:
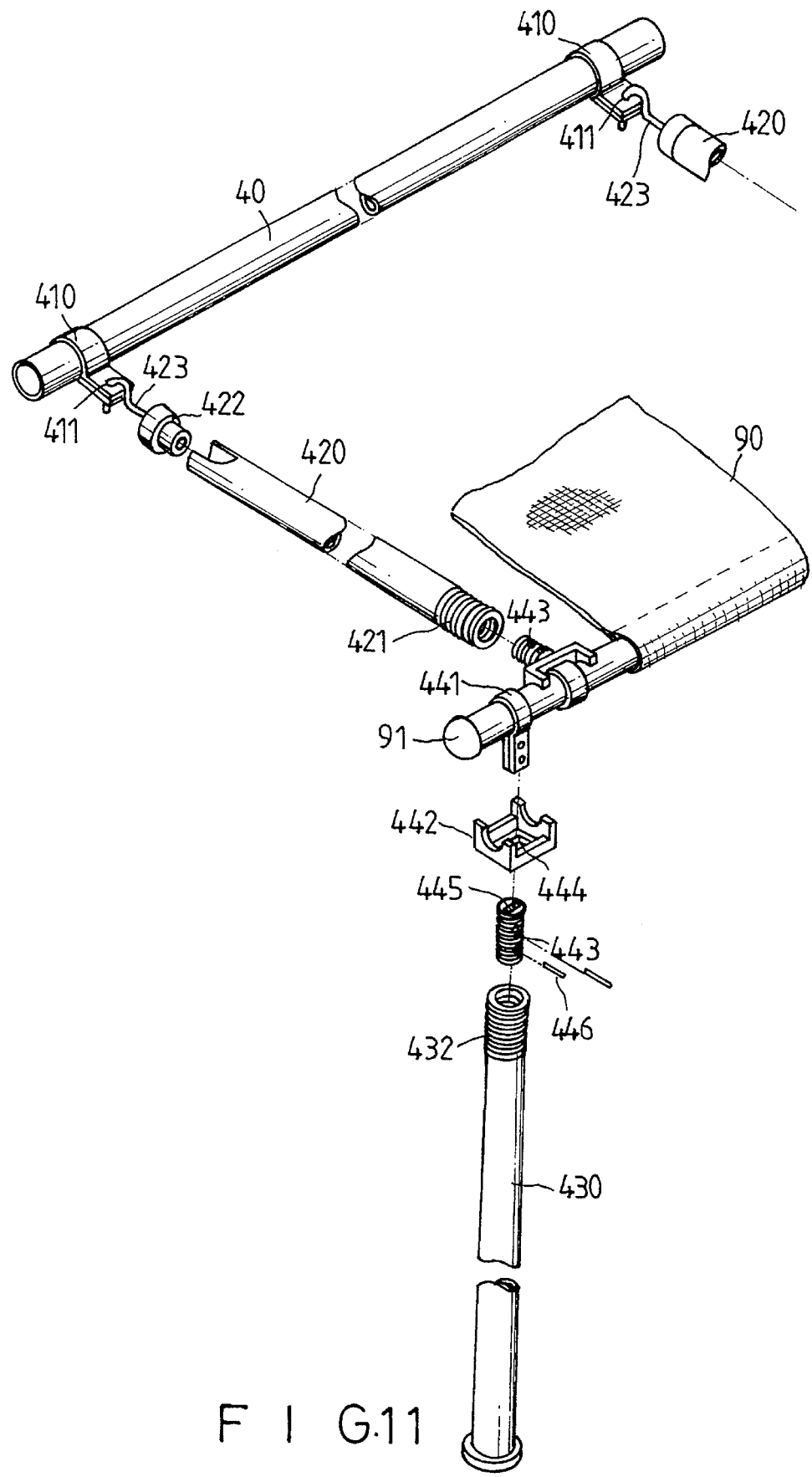
FIG. 11 is a breakdown view of the support frames according to the present invention.

As shown in FIGS. 1 and 11, the support frame (4) consists of two toggles (410), two cross bars (420), two upright bars (230) and four fastening elements (440), wherein the two toggles (410) are directly mounted on the two ends of the fixing rod (40) of the screen-rolling device (1), each toggle (410) has a catch hole (411) to catch a movable hook (423) on the cross bar (420); one end of the cross bar (420) is a threaded connector (421) to engage with a threaded sleeve (443) on the fastening element (440), and another and thereof is a hook seat (422) whereon a movable hook (423) is pivotally provided. A foot pad (431) nested at the bottom end of the upright bar (430) is designed to let the said bottom end stably stand up on the ground without coming off therefrom, and the top end of the upright bar (430) is also a threaded connector (432) to engate with the threaded sleeve (443) of another festening element (440) so that the upright bar (430) can stand up on the ground.

Figure 12:
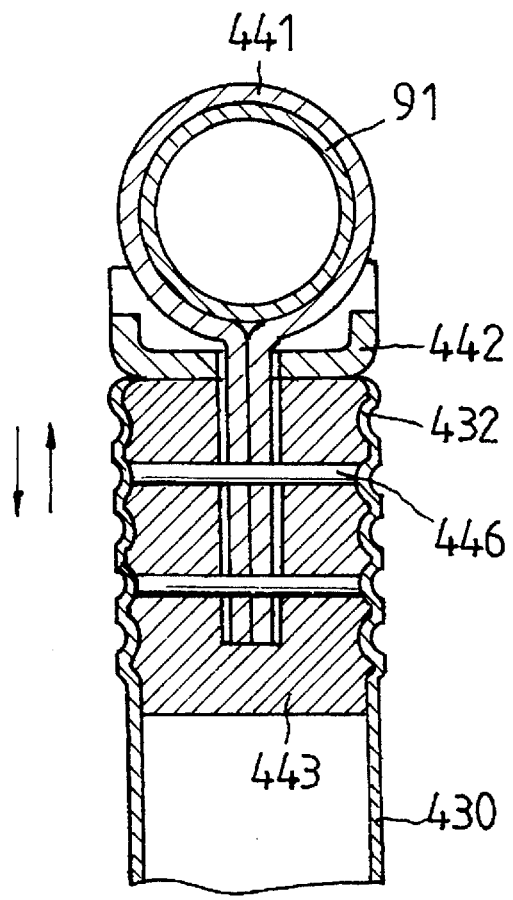
FIG. 12 is a section view of a fastening element according to the present invention.

As shown in FIGS. 11 and 12, the fastening element (440) consists of a fastening clip (441), a clamping block (442) and a threaded sleeve (443), wherein the lower end of the fastening clip (441) can be nested in and extend out from a narrow hole (444) at the center of the clampingg bloci (442) and inserted in a guide hole (445) at the center of the threaded sleeve (443) at the same time, so the fastening clip (441), the clamping block (442) and the threaded sleeve (443) can be combined together through inserting two pins (446) in the threaded sleeve (443) without coming off therefrom. As shown in FIG. 11 and 12, when two fastening clips (441) of four fastening element (440) are respectively nested at the two ends of the tie rod (91) of the screen-rolling device (1), the threaded connectors (421), (432) at one each end of two cross bars (421) and two upright bars (430) are respectively engaged with the threaded sleeves (443) of the four fastening elements (440), and at the same time, through the screwing operation, the threaded connector (443) can push the clamping block (442) of the fastening element (440) upward to force the clamping block (442) tightly clamping the fastening clip (441) so as to fix each cross bar (420), upright bar (430) and tie rod (91) without coming off therefrom each other. As shown in FIG. 12, when the threaded connector (421) of (432) of the cross bar (420) or the upright bar (430) is screwed counterclockwise, the clamping block (442) and the fastening clip (441) can be released from each other in favor of the user's adjusting the positions of each cross bar (420) and upright bar (430).

As shown in FIG. 1, when to assemble the present invention, firstly to stretch open the foldable foot rests (210) of two fixing frames (2) to stand up on the two sides of the roof of a car (3), then to hook the hooks (270) on the flanges on the margins of the roof of the car (3), to use the four catches (260) to adjust the tightness of the foot rest rope (240) and the cap rope (250), and to tightly pull and fix the foldable foot rest (210) so as to finish the construction of the fixing frames (2); nest, to mount and clamp the fixing rod (40) of the screen-rolling device (1) on the two clips (291), (292) at the upper ends of the hollow tubes (220) of the two fixing frame (2), and to use the movable hook (423) to hook one end of the cross bar (420) to connect the fixing rod (40) through hooking the movable hook (423) in the catch holes (411) on the toggles (410) at the two ends of the fixing rod (40), the threaded connector (421) on another end of the cross bar (420) has been engaged with the threaded sleeve (443) on the tie rod (91) provided to the canvas screen (90) of the screen-rolling device (1), so the stretched open canvas screen (90) can be fixed through the construction of the two cross bars (420); and finally, to engage the threaded connector (432) at the top end of the upright bar (430) with the threaded sleeves (443) having been nested on the tie rod (91) so as to fix the tie rod (91) and the two upright bars (430) together and to let the two upright bars (430) stand up on the ground, and then we can use the stretched open canvas screen (90) as a sun shade.

Figure 14:
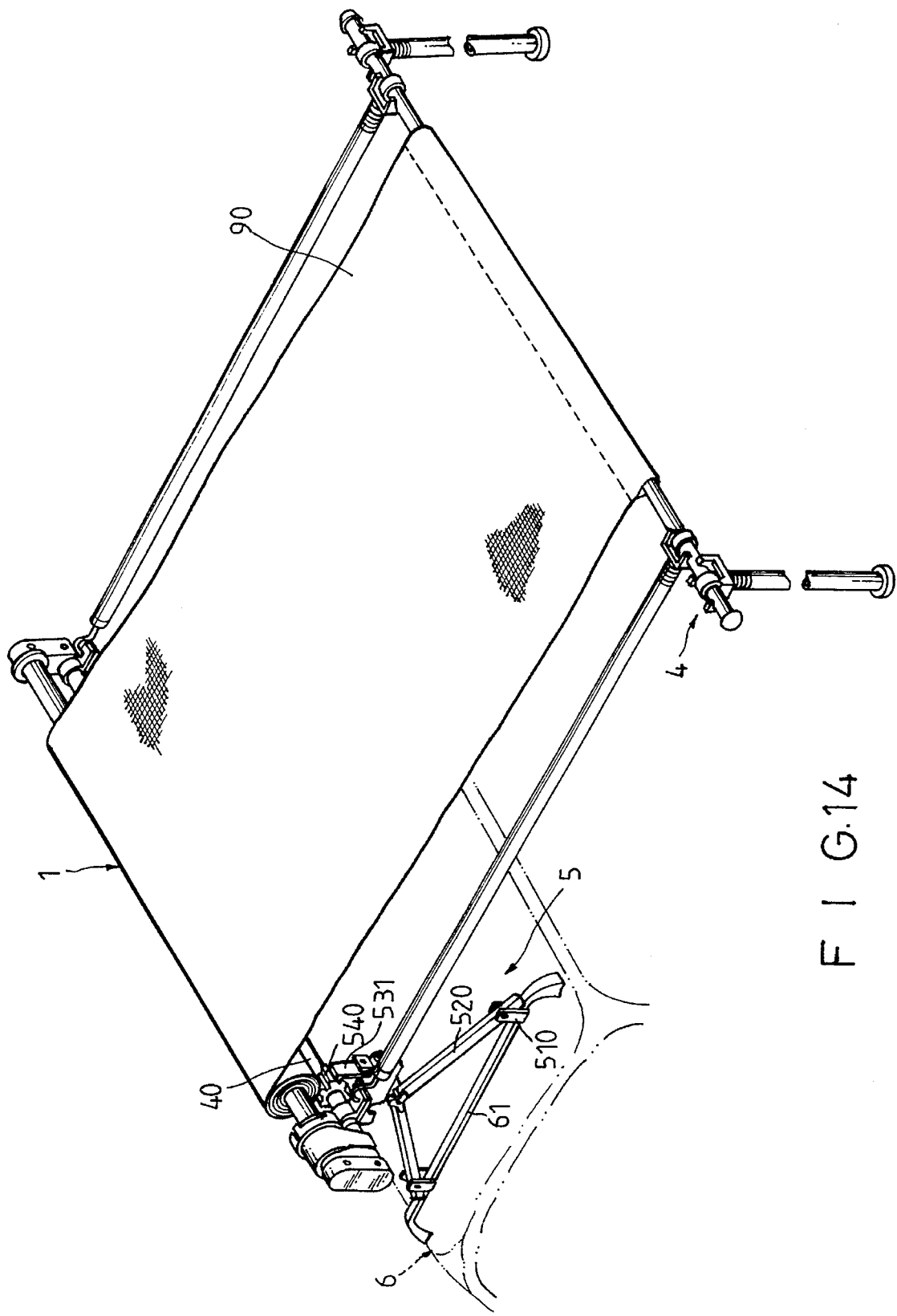
FIG. 14 is another example of the fixing frames (5) mounted on a station wagon according to the present invention.
Figure 15:
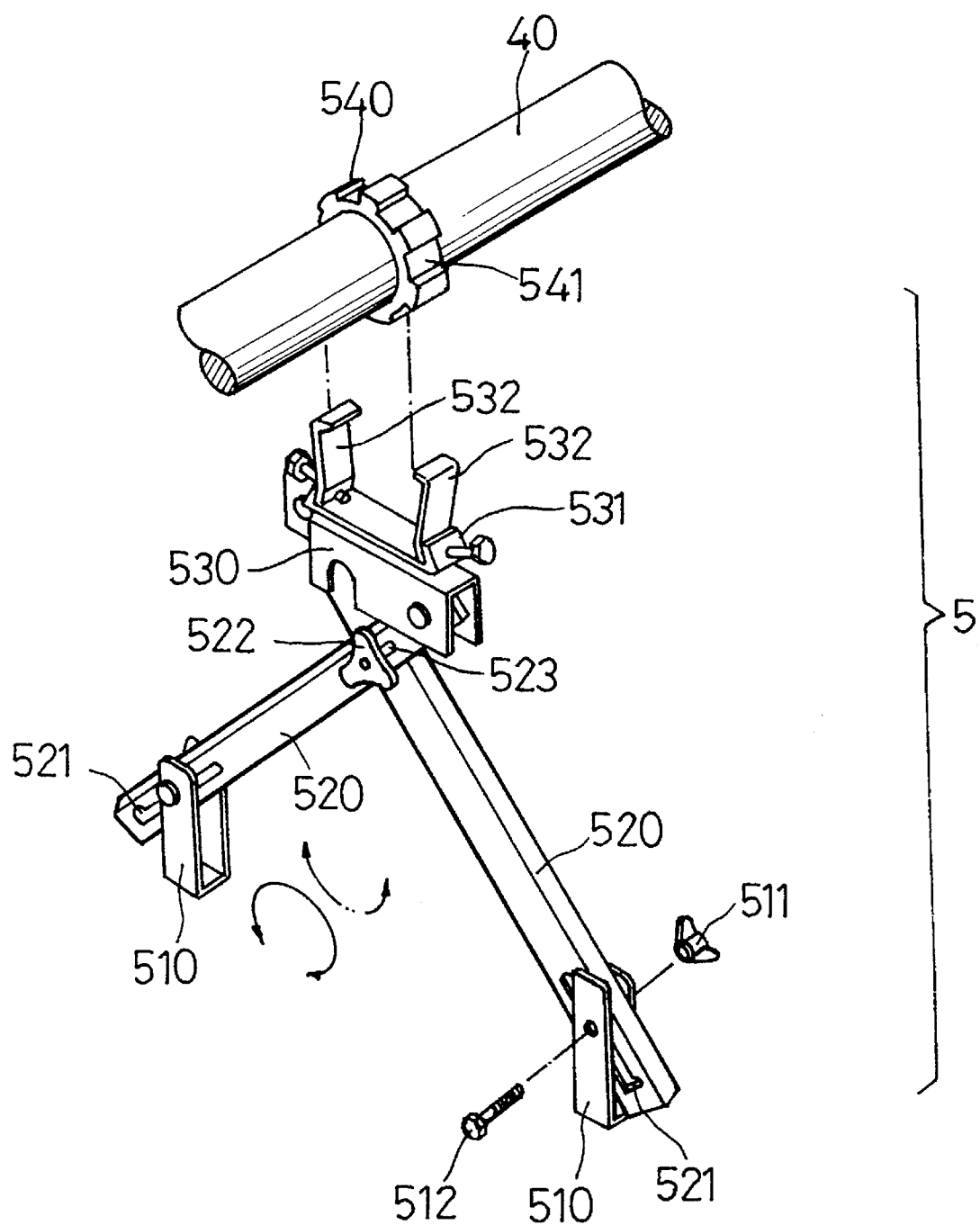
FIG. 15 is a breakdown view of the fixing frames (5) according to the present invention.

As shown in FIGS. 14 and 15, another example of fixing frame (5) is designed for the roof of a sation wagon 6 having been equipped with a loading rack (61), and consists of two cross pivotally connected movable arms (520), two U-shaped nesting elements (510), a clamping seat (530) and two toothed snap rings (540), wherein the two U-shaped nesting elements (510) are directly nested on the loading rack (61) on the roof of a station wagon (6) to movably slide thereon for adjusting a desirable postion through locking a bolt (512) with a butterfly nut (511) in a rectangular hole (521) at the lower end of each one of these two movable arms (520) since the bolt (512), before being locked, can movably slide in the rectangular hole (521). After we set these two U-shaped nesting elements (510) in a desirable position on the loading rack (61) on the roof of a station wagon (6) and lock the bolt (512) in a desirable position in the rectangular hole (521), these two U-shaped nesting elements (510) and these two movable arms (520) are combined together with the loading rack (61).

As shown in FIGS. 14, 15 and 16, through a bolt (522) passing through the two rectangular holes (523) at the upper ends of these two movable arms (520), these two movable arms (520) can be fixed together and the position of stretching open (as shown in FIG. 16) or folding down (as shown in FIG. 17) thest two movable arms (520) can be adjusted. The clamping seat (530) is movably pivoted at the top ends of these two movable arms (520), the top surface of the clamping seat (530) is provided with a clamping piece (531) of which the opposite sides are provided with two corresponding movable hook clips (532) through which a plurality of catch slots (541) on the peripheral surface of the toothed snap rings (540) can be caught to combine the fixing rod (40) with the clamping seat (530).

As shown in FIG. 14 and 15, the two toothed snap rings (540) are respectively nested at the two ends of the fixing rod (40) of the screen-rolling device (1). Upon assembly for use, firstly to nest the U-shaped nesting elements (510) on the two fixing frames (5) directly on the loading rack (61) on the roof of the station wagon (6), next to lock the two movable hook clips (532) of the clamping seat (530) in the catch slots (541) on the toothed snap ring (540) so as to stretch open the fixing frame (5) to stand up on the roof of the station wagon (6) and to install the screen-rolling device (1), then we can stretch open the canvas screen (90) and install the support frames (4) on the ground to be a ready outdoor sun shade.

In view of the above, the structure of the present invention is really a novel outdoor sun shade which is very practical and advanced and therefore patentable.

I claim:

1. An outdoor sun shade, comprising one screen-rolling device, two fixing frames for mounting the screen-rolling device on the roof of a car, and two support frames for mounting the screen-rolling device on the ground, wherein:

the screen-rolling device comprising;
- a left fixing seat with two fixing holes;
- a right fixing seat with two fixing holes;
- a movable seat with an upper toggle and a lower toggle, wherein the upper toggle is nested on a fixing rod, the lower toggle is nested on a shaft lever, a convex grip is provided on one side of the movable seat, a knob with a notch is provided on an outer perimeter of the lower toggle on another side of the movable seat, and an elastic stop block is provided on a wall of the lower toggle;
- a fixing rod, of which two ends are fixed on left and right fixing seats;
- a shaft lever, of which one end together with a loop coter is fixed on the left fixing seat, and another end is fixed on the right fixing seat;
- a twisting spring set nested on the shaft lever, comprising a larger twisting spring, a middle twisting spring, a smaller twisting spring and two connecting thimbles for connecting these three twisting springs, two hook holes on two side walls of these two connecting thimbles, a hook at each of two ends of each of these three twisting springs, the hook at one end of the smaller twisting spring to be hooked and fixed in a hook hole on the shaft lever, and the hook at one end of the larger twisting spring to be hooked and fixed in a hook hole on a catch element;
- a catch element, of which one side is provided with a hook hole and a convex block, and another side is a gear;
- a movable tube with a slot on a right end to be nested on the twisting spring set; and
- a canvas screen, of which one end is fixed on the movable tube and another end is provided with a tie rod;

the fixing frame comprising:
- a foldable foot rest consisting of two corresponding round concave plates to pivotally nest a thimble, and each bottom end of these two round concave plates with two rope holes and a soft pad;
- a hollow tube, inserted in the thimble of the foldable foot rest, a U-shaped catch nested in a top end of the hollow tube, a concave slide way on a perimeter of said tube, a spring catch nested in a lower end thereof to be caught in an upper hole or a lower hole on the thimble so that a higher or lower position of said tube can be adjusted and controlled in the thimble;
- a support seat, whereon four catch holes at a center for catching two ends of the U-shaped catch, and two threaded holes on each of two sides of the support seat;
- an upper clip and a lower clip, of which inner walls are provided with a soft liner, able to clamp and fix the fixing rod of the screen-rolling device;
- a cap nested at a top end of the foldable foot rest, and two opposite rope holes on two sides of said cap;
- four catches, of which each one is provided with three catch holes and two clamps;
- two hooks, of which each one is provided with a hook hole and a hook; and
- a foot rest rope and a cap rope; and the support frame comprising:
- two toggles nested at two ends of the fixing rod of the screen-rolling device, and each of these two toggles with a catch hole;
- two cross bars, one end of each cross bar is a threaded connector, and another end thereof is provided with a hook seat whereon a movable hook is pivotally provided;
- two upright bars, of which each bottom end is provided with a foot pad, and a top end is a threaded connector; and
- four fastening elements, of which each one comprising a fastening clip, a clamping block and a threaded sleeve, two fastening clips nested at two ends of the tie rod, the lower end of each fastening clip nested in and extending out from a narrow hole at a center of the clamping block and inserted in a guide hole at a center of the threaded sleeve;

through the foregoing structure, when the screen-rolling device, fixing frames and support frames are assembled totether integrally, the screen-rolling device can be mounted on the roof of a car through two fixing frames, and the canvas screen of the screen-rolling device can be mounted on the ground through two support frames to form an outdoor sun shade.

2. An outdoor sun shade as claimed in claim 1, wherein a separate brake rod is inside the grip on the movable seat, a front end of the grip is a hook which can catch a catch seat of a lower end of the right fixing seat, and a compression spring is provided inside the grip and nested on the shaft lever.

3. An outdoor sun shade as claimed in claim 1, wherein the fixing frame can also be mounted on a loading rack on the roof of a station wagon and consists of the following members:
- two cross pivotally connected movable arms to be fixed together through a bolt passing through two rectangular holes at upper ends of these two movable arms so as to adjust the position of stretching open or folding down these two movable arms;
- two U-shaped nesting elements adapted to be directly nested on a loading rack on a roof of a station wagon to movably slide thereon for adjusting a desirable position through locking a bolt with a butterfly nut in a rectangular hole at a lower end of each one of these two movable arms since the bolt, before being locked, can movably slide in the rectangular hole;
- a clamping seat to be movably pivoted at top ends of these two movable arms, a top surface of the clamping seat with a clamping piece of which a two opposite sides are provided with two corresponding movable hook clips;
- two toothed snap rings to be respectively nested at two ends of the fixing rod of the screen-rolling device, and a plurality of catch slots on a peripheral surface of the toothed snap rings to be caught to combine the fixing rod with the clamping seat through the two movable hook clips.

\* \* \* \* \*